United States Patent [19]

Hardy, Sr.

[11] 3,869,540

[45] Mar. 4, 1975

[54] MONTMORILLONITE CLAY CATALYSTS FOR THE PRODUCTION OF PHOSPHONITRILIC CHLORIDE

[75] Inventor: Donald Hardy, Sr., Yardley, Pa.

[73] Assignee: FMC Corporation, New York, N.Y.

[22] Filed: May 25, 1973

[21] Appl. No.: 364,057

[52] U.S. Cl................................ 423/300, 423/302
[51] Int. Cl............................................. C01b 25/10
[58] Field of Search............ 423/300, 302; 203/6, 8, 203/41; 252/450

[56] References Cited
UNITED STATES PATENTS

| 3,029,783 | 4/1962 | Sawyer et al. | 252/450 X |
| 3,179,489 | 4/1965 | Becke | 423/300 |
| 3,365,347 | 1/1968 | Lund | 252/450 X |
| 3,379,510 | 4/1968 | Jaszka | 423/300 |
| 3,407,047 | 10/1968 | Paddock et al. | 423/302 |
| 3,575,693 | 4/1971 | Emsley et al. | 423/300 |
| 3,677,720 | 7/1972 | Maund et al. | 423/300 |
| 3,691,099 | 9/1972 | Young | 252/450 |

Primary Examiner—Oscar R. Vertiz
Assistant Examiner—Brian E. Hearn

[57] ABSTRACT

A process for producing polymeric phosphonitrilic chlorides by reacting phosphorus pentachloride with ammonium chloride in the presence of acid-treated Montmorillonite clay catalyst.

4 Claims, No Drawings

MONTMORILLONITE CLAY CATALYSTS FOR THE PRODUCTION OF PHOSPHONITRILIC CHLORIDE

This invention relates to an improved process for the manufacture of phosphonitrilic chlorides by catalyzing the reaction of ammonium chloride with phosphorus pentachloride to produce phosphonitrilic chlorides containing substantial amounts of trimeric and tetrameric cyclic phosphonitrilic chlorides.

Phosphazenes are ring or chain compounds which contain alternating phosphorus and nitrogen atoms in the skeleton, with two substituents on each phosphorus atoms. Phosphonitrilic chlorides are phosphazenes in which at least one substituent is chlorine. Cyclic trimers are conventionally called cyclotriphosphazenes; cyclic tetramers are cyclotetraphosphazenes and high polymers are called polyphosphazenes. Hexachlorocyclotriphosphazene, $(PNCl_2)_3$ is a key intermediate in the synthesis of many phosphazene derivatives. This product is manufactured on a commercial scale in the United States, United Kingdom, and Germany.

The synthesis of phosphazenes involves the reaction of phosphorus pentachloride with ammonium chloride in a solvent such as tetrachloroethane or chlorobenzene. The products of this reaction include the cyclic trimer and tetramer, polymeric cyclic phosphazenes and a series of polymeric linear species which are "end-capped," for example, by the elements of phosphorus pentachloride or HCl. Under favorable conditions, the trimer and tetramer may constitute as much as 90% of the reaction products. It is well known in the art that the reaction comprising heating phosphorus pentachloride and ammonium chloride in a solvent such as tetrachloroethane and monochlorobenzene at reflux temperatures is catalyzed by anhydrous metallic salts which form coordination complexes with ammonia. Such use of aluminum chloride, magnesium chloride, zinc chloride and the like is described in U.S. Pat. No. 3,407,047 issued to Paddock et al Oct. 22, 1968, and U.S. Pat. No. 3,462,247 issued to Paddock et al Aug. 19, 1969. It is also well known that different catalysts have different effects on reactions, and it is always desirable to find new catalysts to catalyze the reaction of ammonium chloride with phosphorus pentachloride.

In accordance with the present invention, there is provided a process in which an acid-treated Montmorillonite clay is the catalyst used in the preparation of phosphonitrilic chloride by the reaction of ammonium chloride with phosphorus pentachloride in an inert solvent. Since U.S. Pat. Nos. 3,407,047 and 3,462,247 to Paddock and Searle emphasize the use of anhydrous metallic salts capable of forming coordination complexes with ammonium, it is surprising that acid-treated Montmorillonite clays, which are hydrated salt mixtures, would be suitable catalysts for the reaction of phosphorus pentachloride with ammonium chloride in an inert solvent.

Fine particle size ammonium chloride (5 to 15 microns in size) or ammonia gas may be used as the nitrogen source. Fine particle size ammonium chloride or ammonia do not require the presence of the catalyst to react with phosphorus pentachloride at suitable reaction rates in producing phosphonitrilic chlorides. It is not always desirable to use ammonia gas, and the fine particle size ammonium chloride (5 to 15 microns in size) is difficult to produce. The cost of preparing the fine particle size ammonium chloride makes it very desirable to use commerical grade ammonium chloride having a mesh size greater than 200 (U.S. Standard Sieve Series — ASTM E-11-61); generally, 60 to 200 mesh material is used in commercial processes. Ammonium chloride having mesh sizes larger than 60 is not generally used because of the long reaction times required.

The reactant phosphorus pentachloride is prepared by the conventional process of the chlorination of phosphorus trichloride in a nonaqueous solvent. The small amounts of nonreacted phosphorus trichloride or possibly phosphorus oxychloride are not harmful to the main reaction.

Simply heating mixtures of ammonium chloride and phosphorus pentachloride produces phosphonitrilic chloride and large amounts of generally undesired oily polymers. The reaction is, therefore, generally carried out by the controlled addition of phosphorus pentachloride to a stirred suspension of ammonium chloride in an inert solvent. It is well known that the preferred solvents for this reaction are chlorinated hydrocarbon solvents such as monochlorobenzene, tetrachloroethane, dichlorobenzene and the like. Preferably, the ammonium chloride is present in the hydrocarbon solvent in an amount of not more than 400 to 500 grams per liter of solvent.

Large proportions of cyclic polymer are produced when a molar excess of ammonium chloride is maintained in the reaction mixture. When a high proportion of cyclic material is desired, the molar excess of ammonium chloride is 10 to 25 mole percent. When the molar ratio of ammonium chloride to phosphorus pentachloride is one to one, or less, large amounts of linear polymer are formed. Acid-treated Montmorillonite clay catalyst catalyzes the formation of either high linear or high cyclic phosphonitrilic chlorides. Phosphorus pentachloride can be added to the reactions in many ways; however, it is usually added slowly as a 50 to 60 percent solution in the solvent of choice in order to obtain a high proportion of cyclic polymers.

The acid-treated Montmorillonite clay catalyst is used in a proportion of at least 1 gram per mole of phosphorus pentachloride, and preferably 3 to 15 grams per mole of phosphorus pentachloride. Larger amounts of catalyst, 50 grams or more per mole of phosphorus pentachloride can be used, but no appreciable advantages are obtained, and it is commercially undesirable to use such large amounts of catalyst.

The reaction of ammonium chloride with phosphorus pentachloride is generally run in the presence of an inert solvent. Solvents of choice have boiling points within the desired temperature range for carrying out the reaction. The reaction may be run without the solvent; however, handling of the reaction product is difficult. Halogenated solvents are preferred for diluting the reaction mixture. Particularly preferred are monochlorobenzene, dichlorobenzene and tetrachloroethane. Standard chemical processing equipment is used in the process of this invention.

The process of the present invention is carried out at an elevated temperature, preferably between about 100° C and the boiling point of the solvent under the conditions of the reaction. It is often convenient, but not necessary to carry out the reaction at the boiling point of the solvent under reflux. Temperatures of 180° C or above can be used, but these high temperatures result in the formation of considerable amounts of polymeric phosphonitrilic chlorides. Preferably, the reaction is carried out at temperatures between 125° and 160° C. A reaction temperature substantially higher than 160° C is not favorable, since losses due to the dissociation of $PCl_5$ to $PCl_3$ and chlorine gas become significant. The solvent of choice should boil sufficiently low that, when removed from the crude phosphonitrilic chloride product, undesirable polymerization does not occur.

The pressure at which the reaction is carried out is not critical, so long as a temperature in the desired range is used, and the elimination of hydrogen chloride reaction by-products is not retarded. Most conveniently the reaction is carried out at atmospheric pressure. The addition rate of phosphorus pentachloride has a pronounced effect on the course of the reaction. Slow addition favors the formation of the cyclic polymers, whereas charging all of the phosphorus pentachloride results in high yields of an oily linear polymer fraction. The reaction is continued until the evolution of hydrogen chloride gas has ceased. The reaction time generally varies between about 6 to about 25 hours.

The following examples further illustrate the invention. All proportions are by weight in the examples and throughout the specification unless otherwise indicated.

EXAMPLE A — HIGH CYCLIC CONTENT

A series of three runs using the Montmorillonite catalyst and a control using no catalyst were run according to the following procedure. The results are given in Table I.

Monochlorobenzene, 3,465 grams, was added to a 22 liter flask equipped with a stirrer, thermometer, jacketed-addition funnel and a reflux condenser. To the monochlorobenzene 1,624 grams (30.36 moles) technical commercial ammonium chloride (50 to 200 mesh) and a catalytic amount of acid-treated Montmorillonite clay was added. The level of catalyst used varied from 80 to 300 grams on a dry weight basis.

The mixture was heated to reflux temperature and the gradual addition of 5,270 grams (25.00 moles) phosphorus pentachloride, as a 60% solution in monochlorobenzene was begun. The rate of phosphorus pentachloride introduction was adjusted so that the addition was completed in about 20 hours. Introduction of phosphorus pentachloride to the control run required 27 hours.

The reaction rate was monitored by titrating the evolved hydrogen chloride. The reaction mixture was then filtered to remove the excess ammonium chloride and catalyst. A portion of the filtrate was vacuum distilled to remove the monochlorobenzene. The ratio of cyclic to linear polymers was measured by the selective partitioning of the cyclic polymer into hexane. The amount of reactants, the time required to feed the phosphorus pentachloride, the total reaction time, the ratio of catalyst to moles of phosphorus pentachloride, the percent of theory of hydrogen chloride gas evolved and the cyclic-linear ratio of the phosphonitrilic chloride product are set forth in Table I.

TABLE I

| Ex. | Moles of Reactants $PCl_3$ | Moles of Reactants $NH_4Cl$ | $PCl_5$ Fed. Hrs. | Total Reaction Time Hrs. | Grams Acid Montmorillonite per Mole $PCl_5$ | % of Theory HCl Off | Cyclic Linear Ratio |
|---|---|---|---|---|---|---|---|
| 1 | 25 | 30.4 | 21 | 22 | 12.0 | 93 | 88:12 |
| 2 | 25 | 30.4 | 20.5 | 23 | 3.2 | 96 | 98.5:1.5 |
| 3 | 25 | 30.4 | 20.5 | 24 | 3.2 | 96 | 95:5 |
| 4 | 25 | 30.4 | 27 | 37 | No catalyst | 90 | 65:35 |

EXAMPLE B — HIGH-LINEAR POLYMER

A solution of 688 grams (5.0 moles) of phosphorus trichloride in 688 grams of monochlorobenzene was placed in a 5-liter flask equipped with a stirrer, thermometer, the chlorine inlet and a Dry Ice condensor. Chlorine gas was gradually added to this solution (355 grams or 5.0 moles of chlorine) to make 1040 grams (5.0 moles) of phosphorus pentachloride. The chlorine addition was carried out in 90 minutes, during which the reaction temperature gradually rose to 117° C due to the heat of the exothermic reaction. The phosphorus pentachloride solution was cooled to 50° to 60° C, and 15.5 grams of dry Montmorillonite acid clay catalyst was added. To the reactor was then added 267 grams (5.0 moles) of commercial ammonium chloride over a period of 15 minutes. The reaction temperature was raised to reflux over a period of about 1 hours, and the reaction progress was followed as in Example A. The reaction was completed in 21 hours with a recovery of 95% of the hydrogen chloride theoretically expected.

A control experiment using no catalyst was run; it took 38 hours to complete the reaction to the same degree, i.e., 95% of theoretical amount of hydrogen chloride evolved.

As will be apparent to those skilled in the art, numerous modifications and variations of the embodiments illustrated above may be made without departing from the spirit of the invention or the scope of the following claims.

What is claimed is:

1. A process for the production of phosphonitrilic chlorides which consists essentially of heating phosphorus pentachloride with ammonium chloride having a particle size greater than 200 mesh in an inert solvent at a temperature greater than 100° C and in the presence of at least 1 gram of acid-treated Montmorillonite clay for each gram-mole of $PCl_5$ charged to the reaction mixture.

2. The process of claim 1 in which 3 to 15 grams of acid-treated Montmorillonite acid clay catalyst are used per gram-mole of phosphorus pentachloride.

3. The process of claim 1 in which the reaction temperature is between 125° and 180° C.

4. The process of claim 1 in which the solvent is selected from the group consisting of monochlorobenzene, dichlorobenzene and tetrachloroethane.

* * * * *